United States Patent
Terry et al.

(10) Patent No.: US 12,514,749 B2
(45) Date of Patent: Jan. 6, 2026

(54) EYE LUBRICANT

(71) Applicant: Meibomian Solutions LLC, Columbus, OH (US)

(72) Inventors: Clifford Michael Terry, Laguna Beach, CA (US); Alice T. Epitropoulos, Columbus, OH (US)

(73) Assignee: Meibomian Solutions LLC, Columbus, OH (US)

( * ) Notice: Subject to any disclaimer, the term of this patent is extended or adjusted under 35 U.S.C. 154(b) by 640 days.

(21) Appl. No.: 17/813,567

(22) Filed: Jul. 19, 2022

(65) Prior Publication Data

US 2023/0028881 A1 Jan. 26, 2023

Related U.S. Application Data (60) Provisional application No. 63/259,486, filed on Jul. 21, 2021.

(51) Int. Cl.
| | | |
|---|---|---|
| *A61F 9/00* | (2006.01) | |
| *A61K 9/00* | (2006.01) | |
| *A61K 9/16* | (2006.01) | |
| *A61K 31/75* | (2006.01) | |

(52) U.S. Cl.
CPC .......... *A61F 9/0008* (2013.01); *A61K 9/0048* (2013.01); *A61K 9/16* (2013.01); *A61K 31/75* (2013.01)

(58) Field of Classification Search
None
See application file for complete search history.

(56) References Cited

U.S. PATENT DOCUMENTS

| | | | | |
|---|---|---|---|---|
| 3,960,150 A * | 6/1976 | Hussain | ............... | A61K 9/0051 424/428 |
| 4,966,773 A * | 10/1990 | Gressel | ............... | A61K 9/0048 514/693 |
| 6,007,826 A | 12/1999 | Benita | | |
| 2008/0193511 A1 * | 8/2008 | Massing | ................. | B01F 29/10 422/243 |
| 2012/0269760 A1 * | 10/2012 | Akagi | .................. | A61K 9/0048 424/78.04 |
| 2020/0179281 A1 * | 6/2020 | Willis | .................... | A61K 9/107 |

FOREIGN PATENT DOCUMENTS

EP 0535545 A1 4/1993

OTHER PUBLICATIONS

Lukasz Cwiklik, "Tear film lipid payer: A molecular level view", Biochimica et Biophysica Acta 1858 (2016) 2421-2430.
Prydal et al., "Study of Human Precorneal Tear Film Thickness and Structure Using Laser Interferometry", Investigative Ophthalmology & Visual Science, vol. 33, No. 6, May 1992.
Ako-Adounvo et al., "Recent Patents on Ophthalmic Nanoformulations and Therapeutic Implications", Recent Pat Drug Deliv Formul, 2014, 8(3), 193-201.
International Search Report and Written Opinion issued in App. No. PCT/US2022/073978, dated Nov. 14, 2022, 10 pages.

* cited by examiner

*Primary Examiner* — Ali Soroush
*Assistant Examiner* — Elizabeth Anne Meyers
(74) *Attorney, Agent, or Firm* — FIG. 1 Patents (57) ABSTRACT

A mixture for enhancing eye lubrication comprises a plurality of microspheres having diameters ranging from about 5-40 microns combined with an aqueous component comprising water. The microspheres can be coated with oil. When the mixture is applied to the surface of a user's eyes, the microparticles will enhance lubrication during blinking and partially lift eyelids so that other components of the mixture can be better distributed beneath the eyelids. An oil can be added to the mixture. Preferably the oil is configured so that, when the mixture is agitated, it forms a temporary, thermodynamically unstable emulsion from which the oil quickly disassociates when the mixture is applied to the eye. The oil thus is quickly available to enhance lubrication performance.

20 Claims, 4 Drawing Sheets

EYE LUBRICANT

CROSS-REFERENCE TO RELATED APPLICATIONS

This application claims the benefit of U.S. Application Ser. No. 63/259,486, which was filed 2021 Jul. 21, the entirety of which is hereby incorporated by reference.

BACKGROUND

The present disclosure relates to the field of medicaments for enhancing tear film.

Tear film is made up of three general layers: an inner mucin layer, an outer lipid layer, and an aqueous layer between the mucin layer and lipid layer. When there are problems with a person's tear film they can experience substantial eye discomfort, such as dry eye, sensations of burning and grittiness, or the like. Medicated eye drops are often used in an effort to relieve such discomfort and to improve eye lubrication and hydration. However, such lubricating drops lose their effect after several minutes, as they are quickly washed out of the eye by the tear drainage system.

SUMMARY

The present disclosure discloses aspects that improve therapy for lubricating the eye and enhancing tear film. In accordance with one embodiment, the present invention provides a mixture for administration to the surface of a user's eye. The mixture comprises a plurality of microparticles having a range of sizes of 2-60 microns in diameter, and an aqueous portion comprising sterile water.

In some versions, the microparticles are coated with oil or another lubricant. The microparticles can be buoyant relative to water, and in particular buoyant relative to an aqueous part of a user's tear film.

In additional versions, the microparticles are between about 5-40 microns in diameter.

In some versions, the microparticles comprise a polyethylene wax.

In further versions, the microparticles are generally spherical. In some such versions, the microparticles are between about 5-40 microns in diameter, and in other versions the microparticles are between about 15-25 microns in diameter.

In additional versions, the mixture comprises an oil portion. The oil component and the aqueous portion can be configured so that when they are agitated to be mixed they form a thermodynamically unstable emulsion in which the oil is suspended (and not bound) as droplets within the water. In some such versions, the thermodynamically unstable emulsion is configured so that at least 50% of the oil disassociates from sterile water within 30 seconds or one or two minutes of being agitated to form the thermodynamically unstable emulsion.

In additional versions, the microparticles comprise a polyethylene wax, and the oil component comprises castor oil.

In accordance with another embodiment, the present specification provides a mixture for administration to the surface of a user's eye. The mixture comprises an oil component and an aqueous portion comprising sterile water. The oil component and aqueous component are configured to form a thermodynamically unstable emulsion when combined and agitated. In some such embodiments, the thermodynamically unstable emulsion is configured so that at least 75% of the oil disassociates from the sterile water within one minute, or within two minutes, of being agitated to form the thermodynamically unstable emulsion. When applied to the user's eye, a substantial proportion (such as over 25%, 50% or more) of the oil disassociates from the water and coalesces to form an oil film within 10 seconds or within 20 seconds so as to supplement the lubricating lipid layer. In some versions, 10% or more of the oil in a drop applied to a user's eye disassociates from the sterile water within about 5 seconds and coalesces to form an oil film.

Some versions additionally comprise a plurality of microspheres formed of a non-polar material and having diameters in the range of 10-30 microns.

In additional versions, the mixture is disposed within an eye dropper bottle, and an agitator is disposed within the bottle so that when the bottle is shaken the mixture is agitated to form the thermodynamically unstable emulsion. The eye dropper bottle is configured to deliver a drop of the agitated mixture to the eye surface.

In accordance with another embodiment, the present specification provides a method of providing therapy for dry eyes. The method comprises administering to the surface of the eye a mixture comprising an aqueous component comprising sterile water and a microparticle component comprising a plurality of microparticles having diameters between about 5-40 microns. The microparticles can mostly be the same size or can comprise a group of microparticles have a variety of sizes within the diameter range.

In some versions, the microparticles are generally spherical, and have diameters in the range of 5-40 microns, and are coated with oil or another lubricant.

In further versions, the mixture additionally comprises an oil component.

Yet further versions can include agitating the mixture immediately prior to administering it to the surface of the eye, and the oil component and the aqueous component are configured so that when agitated a thermodynamically unstable emulsion is formed.

In accordance with another embodiment, the present specification provides a method of preparing a mixture to provide therapy for dry eyes. The method comprises mixing a plurality of microparticles having diameters between about 5-40 microns with an oil, and mixing the oil and microparticles with an aqueous component comprising sterile water to form the mixture. The mixture is then disposed in an eyedropper bottle that can have an agitator structure disposed therewithin.

In yet another embodiment, an excipient configured to be added to eye drops comprises a mixture of oil and microparticles having diameters between about 5-40 microns.

In yet another embodiment, a method of preparing a mixture for providing therapy to dry eyes is disclosed. The method may comprise the steps of mixing a plurality of microparticles having diameters between about 5-60 microns with an oil; mixing the oil and microparticles with an aqueous component comprising water to form the mixture; and disposing the mixture in an eyedropper bottle having an agitator structure disposed therewithin.

DESCRIPTION

The present disclosure describes aspects of inventive eye drop mixtures that can mitigate dry eye symptoms as well as enhance the function of the user's own tear film. Some aspects can also be used to enhance the effectiveness of delivering drugs via eye drops.

In one aspect, an eye drop mixture includes a polar aqueous portion, which includes sterile water molecules, and an oil portion made up of non-polar oils and/or other lipids. Other substances, such as carboxymethylcellulose, hyaluronate and/or mucus, can also be included in the mixture. The mixture can be provided in an eye dropper bottle having an agitator, such as a stainless steel ball, disposed therewithin. The oil and sterile water are initially separated and when shaken together are configured in a thermodynamically unstable emulsion that disassociates quickly (e.g., 50% or more disassociates in less than 30 second, 1 minutes or 2 minutes). During use, prior to administration, the dropper bottle is shaken to temporarily emulsify the mixture (which can be aided with the agitator). After a drop of the agitated mixture is applied to the eye, the oil and sterile water disassociate quickly while on the ocular surface, thus enhancing the oil's ability, as part of the tear film lipid layer, to provide lubrication during blinking. Other substances within the mixture can enhance layers of the tear film.

The various aspects described herein may be applied to delivering another active ingredient (e.g., menthol) under the eyelid and to the cornea of the eye. For example, menthol may be added to a mixture containing an aqueous solution, oil coated over microphericals and one of carboxymethylcellulose, hyaluronic acid, mucin or combinations thereof to deliver the menthol to an exterior surface of the eye.

In another aspect, an eye drop mixture can include microspherical particles, referred to as microspheres, having diameters between about 1-60 microns, more preferably between about 5-40 microns, and in other embodiments between about 10-30 or 15-25 microns. When administered to the ocular surface, the microspheres get under the eyelids, and can lift the eyelids to create space so as to facilitate distribution of lubricating oil and/or can function in a manner similar to ball bearings to lubricate the eyelids during blinking. Such microspheres can be included in a mixture, as discussed above, in which oil and sterile water are configured in a thermodynamically unstable emulsion that disassociates quickly. As the mixture is agitated prior to administration, the microspheres can be distributed generally evenly throughout the mixture and can be coated with oil.

The microspheres can be made of a non-polar material such as polyethylene wax. Further, the microspheres may not all be the same size and diameter, but may be provided having a range of sizes.

Figure 1:
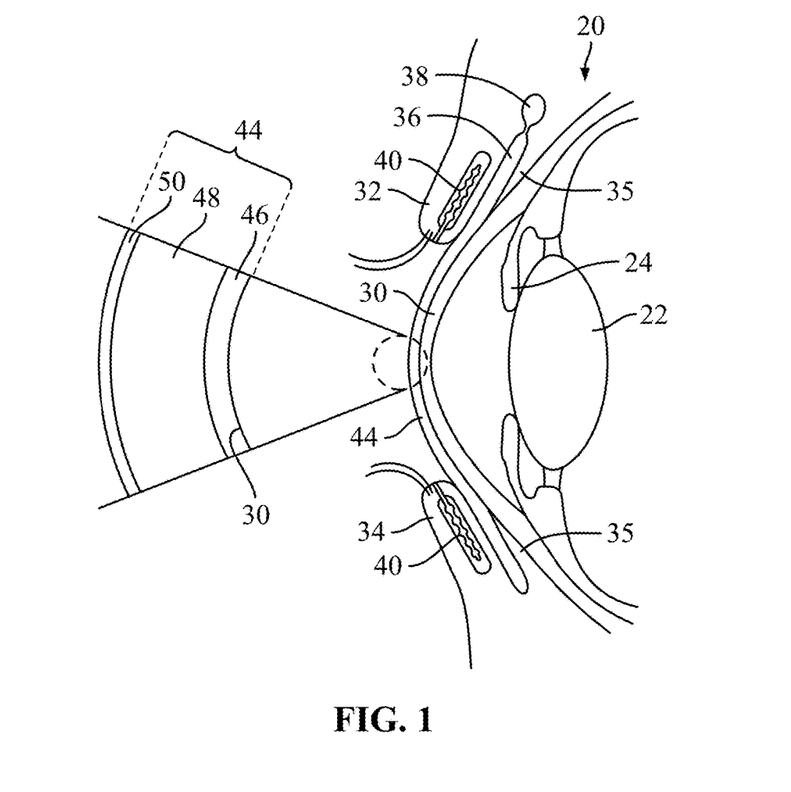
FIG. 1 is a cross-sectional view of a portion of a human eye, including an expanded, schematic view of a tear film.

With initial reference to FIG. 1, a human eye 20 includes a lens 22 and iris 24 disposed behind a cornea 30. An upper eyelid 32 and lower eyelid 34 move over the cornea 30 while opening and closing the eye 20. The conjunctiva 35 is disposed adjacent to the cornea 30. A space referred to as the cul-de-sac 36 is defined between the eyelid 32, 34 and the conjunctiva 35, and can receive secretions from glands such as a lacrimal gland 38. A plurality of meibomian glands 40 are disposed in the upper and lower eyelids 32, 34, and have openings adjacent to a margin of each eyelid. Typically, a human eye includes about 25 meibomian glands 40 disposed along the upper eyelid 32 and about 20 meibomian glands 40 disposed along the lower eyelid 34.

A tear film 44 is disposed on the surface of the cornea 30. Healthy tear film 44 is made up of three layers; the mucin layer 46, the aqueous layer 48, and the lipid layer 50. The tear film 44 is generally believed to be between about 3 and 46 microns thick altogether. The mucin layer 46 is the innermost layer. It comprises mucus and adheres to the surface of the cornea 30 and conjunctiva 35. The aqueous layer 48 makes up the bulk of the tear film 44. It is comprised mostly of sterile water, but can also include substances such as proteins, electrolytes, organic molecules and water-soluble gases. The lipid layer 50 is the outermost layer of the tear film 44, and is made up of a collection of lipids, including waxes and oils. It is believed that the contents of the lipid layer 50 are supplied mostly by the meibomian glands 40, being secreted during blinking. The lipid layer 50 aids in resisting evaporation of the tear film 44, and also provides lubrication during blinking. The eyelids 32, 34 have a mucus coating on the inner surfaces. This mucus coating of the eyelids slides over the lipid layer 50 during blinking and during eye movement.

Figure 2:
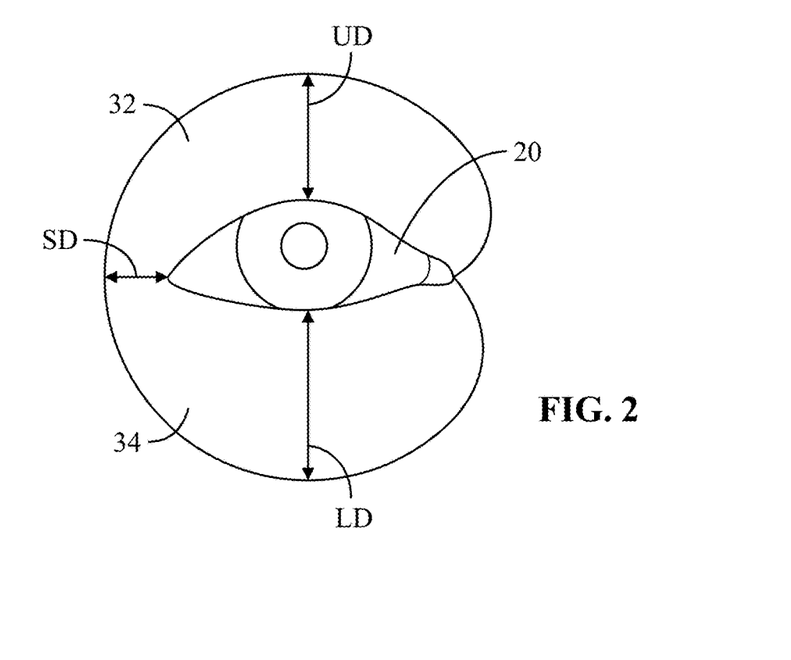
FIG. 2 is a front schematic view of a human eye and eyelids.

The tear film 44 serves multiple purposes in supporting eye function and protecting the eye, including providing lubrication. Not only is such lubrication helpful during blinking, which is anticipated to occur about 1800 times each hour, but also during movement of the eye under the lids. With additional reference to FIG. 2, even when the eyelids 32, 34 are in an open configuration as shown, a substantial portion of the eye 20 is covered by the eyelids 32, 34. For example, an upper distance UD is typically about 13 mm, a LD is about 9 mm, and a side distance SD is about 5 mm. As the eyelids 32, 34 are in apposition to the eye 20, and apply light pressure against the eye 20, lubrication between the eyelids 32, 34 and eye 20 enables eye movement relative to the eyelids 32, 34 to take place without discomfort or damage.

Deficiencies in the tear film lead to maladies such as dry eye disease. In some cases, dry spots, referred to as punctate keratopathy, form on the cornea. In other cases, patients experience dry eye discomfort without such clinical signs. In some cases patients have both punctate keratopathy and discomfort, but the signs and symptoms don't always correlate.

Figure 3:
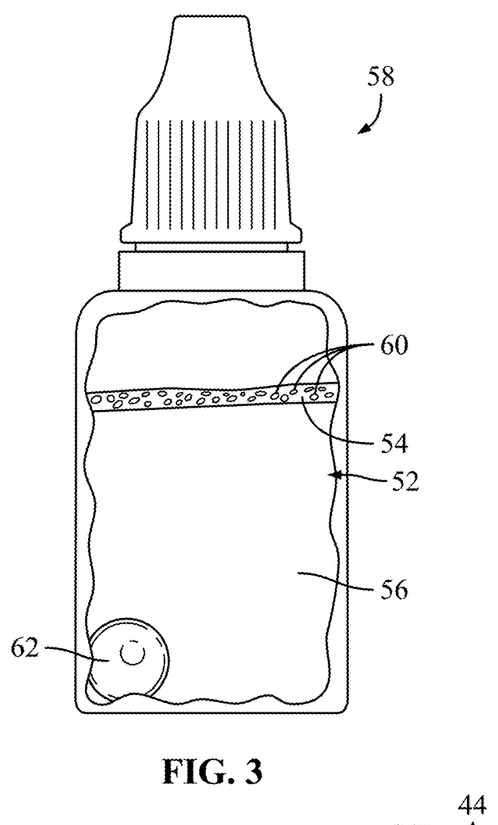
FIG. 3 shows an eye dropper bottle cutaway to show a mixture held therewithin in a static condition.

In accordance with one aspect, and with reference to FIG. 3, a mixture 52 intended for topical application onto a user's eye surface to provide therapy for tear film deficiency comprises an aqueous component 56 and also includes a plurality of microspheres 60. The microspheres 60 preferably have diameters ranging from 1 micron to 60 microns, more preferably greater than 5 microns and less than 40 microns, and also can be between about 10-30 microns or about 15-25 microns. In one aspect, the microspheres 60 are made of a polyethylene (PE) wax. In one embodiment, micronized PE powder known as "Micropoly® 1160S", which is available from Micro Powders, Inc., can be used for the microspheres. It is to be understood that other biocompatible materials that can be micronized into generally spherical particles can also be used for the microspheres 60. Preferably, the microspheres 60 are buoyant relative to sterile water, and will be buoyant in an aqueous solution.

Figure 5:
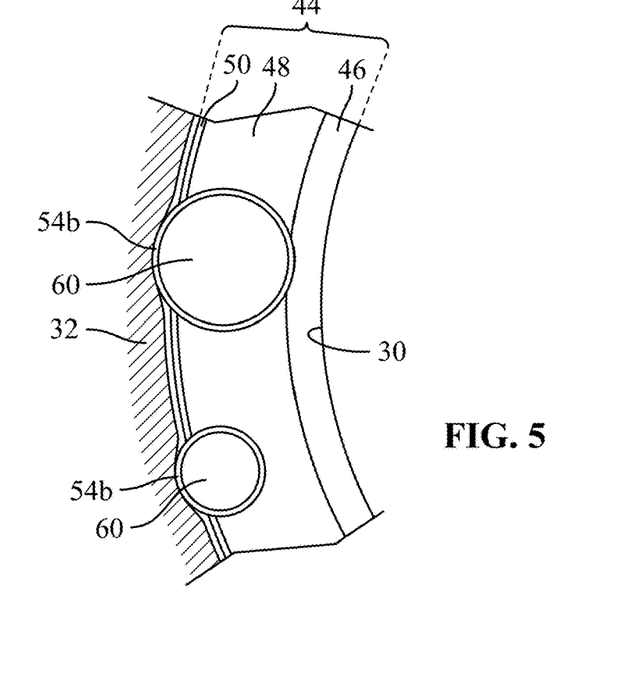
FIG. 5 is a schematic, sectional view of a user's eye tear film after a drop of the mixture of FIG. 4 has been delivered to the eye.

In one aspect, the microspheres 60 are coated with a lubricant such as oil 54b (see FIG. 5). When taken in this context, it is intended that the word "oil" includes lubricants, including other lipids. The oil and microspheres can be nonpolar molecules and, thus, are not soluble in water, which is polar. However, the oil will stick to the microspheres. The oil can be selected to have properties, such as viscosity, that are similar to corresponding properties of the lipid layer 50 of the tear film 44. In an embodiment the PE microspheres 60 are coated in castor oil. Other oils, such as mineral oil or olive oil can also be used, as well as polyethylene glycol, other lipids, or combinations of two or more of these substances.

In an embodiment as depicted in FIG. 3, microspheres 60, which may be coated in oil, are mixed with an aqueous component 56 to form a mixture 52 adapted to be applied to a user's eye surface to provide therapy for tear film deficiency. The aqueous component 56 can be as simple as sterile water, but can also include other components common to eye drops, including excipients (e.g., microspherical) and substances that may help the mixture to mimic at least some aspects of the various substances in the natural tear film 44. For example, carboxymethylcellulose hydrated to form a suspension in sterile water and/or hyaluronic acid, ingredients for pH adjustments, isotonic agents and the like can also be included, as well as preservatives if desired. In some instances, medicaments such as drugs can be added.

In another aspect, an aqueous component 56 as just described can be combined with oil 54, with or without also including the microspheres 60. As with the natural lipid layer 50, preferably the oil makes up a relatively small proportion of the overall mixture, such as about 3 drops of oil 54 out of 10 cc of the aqueous component 56. Preferably, the oil is selected so that, when shaken with the aqueous component, the resulting mixture forms a thermodynamically unstable emulsion in which droplets of the oil 54 are suspended (and not bound) in the aqueous component 56, and in which the oil 54 quickly disassociates after mixing. More specifically, the oil component 54 quickly separates from the aqueous component at or faster than a threshold disassociation rate when a drop of the mixture 52 is delivered to a user's eye so that a significant proportion of the oil that was in the temporary emulsion is available and unencumbered by sterile water so that it coalesces into an oil film and is more effective in its role as a lubricant. The threshold disassociation rate can be, for example, at least 75% of the oil disassociates from the water within one minute, or within two minutes, of being agitated to form the thermodynamically unstable emulsion. When applied to the user's eye, the threshold disassociation rate can be configured so that a substantial proportion (such as over 25%, 50% or more) of the oil disassociates from the water and coalesces to form an oil film within 10 seconds or within 20 seconds so as to supplement the lubricating lipid layer. In some versions, the threshold disassociation rate can be calculated as 10% or more of the oil in a drop applied to a user's eye disassociates from the water within about 5 seconds and coalesces to form an oil film. In yet additional versions, the threshold disassociation rate can be, for example, 20%, 30% or 40% of the oil disassociates from the aqueous component within two minutes, or at least about 40%, 50% or 60% of the oil disassociates from the aqueous component within three minutes, or at least about 70%, 80% or 90% of the oil disassociates from the aqueous component within four minutes.

In FIG. 3, the mixture 52 of oil 54 and the aqueous component 56 can be disposed in a dropper bottle 58 configured to dispense eye drops. In the illustrated embodiment, microspheres 60 are also included in the mixture 52. As shown, the bottle 58 is stationary, and the oil 54 has separated from the aqueous component 56 to form a layer disposed over the aqueous component 56. The microspheres 60 remain with the oil 54. The dropper bottle 58 can be of any standard size configured for delivering drops to a user's eye. Each drop can be expected to have a volume of about 0.05 mL. Although it is to be understood that there can be significant variation from this typical volume, a typical eye drop volume can be expected to be within about plus or minus about 0.020 mL of this expected volume.

Figure 4:
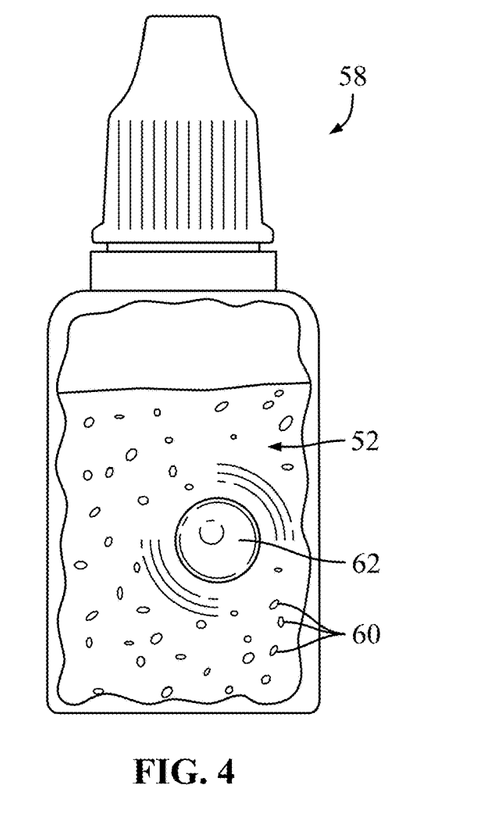
FIG. 4 shows the eye dropper bottle of FIG. 3 while being shaken so as to agitate the mixture.

With additional reference to FIG. 4, an agitator 62 can be provided inside the bottle 58. The agitator 62 is configured so that, when the bottle 58 is shaken, as depicted in FIG. 4, the agitator 62 agitates the mixture, temporarily emulsifying the oil 54 with the aqueous component 56 and dispersing both oil and microspheres randomly, and generally evenly, through the mixture. The agitator 62 can be of various shapes and sizes. In one version, the agitator 62 can be a stainless steel ball having a diameter of about 4 mm. To prevent the agitator ball from possibly blocking the nozzle of the bottle 58, a blocker, such as a 5 mm disc having a hole in the center, can be arranged within the bottle 58. Preferably, the bottle 58 is configured to accommodate the agitator 62, as well as the oil 54 and aqueous 56 components. The bottle can be formed of PE. In some instances, bottles made of glass or Teflon can also be employed.

Upon shaking the bottle 58, the oil 54 is temporarily emulsified in the aqueous component 56, and the microspheres 60 are distributed throughout the aqueous component 56. The user can then administer a drop of the mixture to the surface of the eye. Since the mixture 52 is only a temporary emulsification, and as discussed above the oil 54 will disassociate from the aqueous component 56 file while upon the user's eye 20, and at a disassociation rate at least as fast as the threshold disassociation rate. When oil is emulsified with sterile water, it loses lubricity. Thus, when a portion of the oil 54 disassociates from the aqueous component 56, that portion of the oil 54 has improved lubricant function then does the oil that is still emulsified. Thus, it is desired that as much of the oil 54 as possible disassociates with the aqueous component 56 as soon as practicable after being applied to the user's eye 20. It is desired that the mixture stays mostly in the temporary emulsion long enough for a user to administer the eye drops. However, the mixture 52 is configured so that the oil 54 disassociates from the aqueous portion 56 at a rate of at least the threshold disassociation rate as discussed above. In such variations, in which the oil 54 quickly disassociates from the aqueous component 56, the oil 54 quickly obtains improved lubricity, providing improved lubrication to the eyes 20.

FIG. 5 schematically shows a user's tear film 44 when a mixture 52 including microspheres 60 having an oil coating 54b has been applied to the eye surface. As depicted, the microspheres 60 are supported by and in the eye film 44, and can extend outwardly distal of the outermost lipid layer 50 in a direction opposite the cornea 30. As such, an inner surface of the eyelid 32 can be supported, or slightly lifted, by the microspheres 60. As the eyelids 32, 34 tend to exert light pressure on the cornea 30 and eye 20, this slight lifting will allow space for the oil 54 and sterile water to move and distribute throughout the area underneath the eyelids 32, 34, including the cul-de-sac 36. Tear film mechanics are thus improved throughout the operational area. Also, since the microspheres 60 are round, they can operate in a manner similar to ball bearings, both supporting the eyelids 32, 34 off of the ocular surface, and facilitating blinking. Further, during blinks, the forward edges of the eyelids 32, 34 tend to wipe materials off the eye. As such, previous eyedrops tend to be wiped out of the eye relatively quickly, limiting their time of action. The microspheres 60 gently lift such forward edges of the eyelids 32, 34, enabling oil 54, and even aqueous 56, from the mixture 52 to get under the eyelids 32, 34, and to reduce the amount of the mixture 52 that is wiped off from blinking. The eyelids are lifted a regulated distance above the lipid layer 50 of the tear film 44, although the lids may flex around the microspheres 60. The regulated distance can be, for example, between about 0.1-1 microns, in other variations about 2-5 microns, and in yet other variations about 2-15 microns.

In the embodiment illustrated in FIGS. 3 and 4, microspheres 60 are included with the oil 54. It is to be understood that, in another aspect, the oil 54 as described, which forms only a temporary, thermodynamically unstable emulsion with the aqueous component 56, can be provided in a mixture for eyedrops with or without also including microspheres 60. Even without microspheres 60, the quickly-disassociating oil 54 improves lubrication relative to previous stable emulsions of oil and sterile water used in previous eyedrops.

In one embodiment, the oil portion 54 of a mixture 52 is created by first staring Micropoly® 1160S PE powder into castor oil and allowing it to stand for several weeks or otherwise treated to eliminate air. Proportions in one variation are consistent with 7 US teaspoons of Micropoly® 1160S PE powder stirred into 6 fluid ounces of castor oil. The castor oil coats the PE powder to form microspheres 60 having a thin oil coating 54b. Three drops of this mixture can be added to 10 cc of an aqueous portion 56 comprising carboxymethylcellulose (0.5%) suspension in sterile water, preferably with proper isotonicity and buffering.

Figure 6:
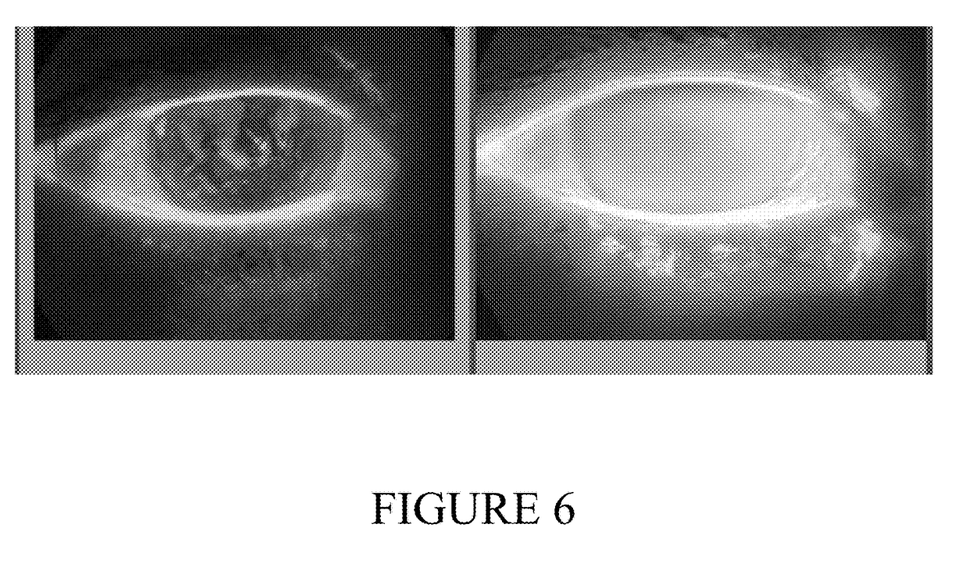
FIG. 6 includes clinical images of a patient's eye taken before and after providing therapy to a person with a mixture prepared in accordance with an embodiment discussed herein.
Figure 7:
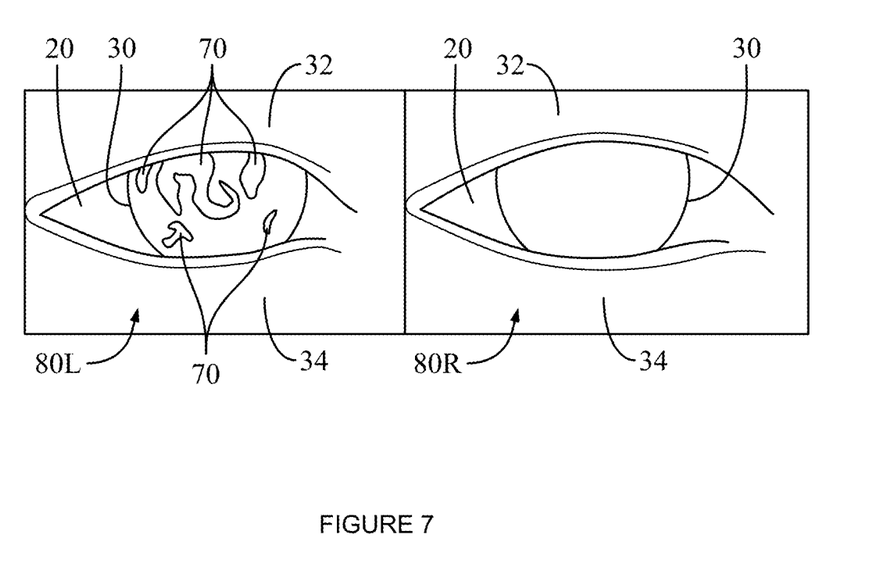
FIG. 7 is line drawings of the images shown in FIG. 6.

Such a mixture 52 was used employing Micropoly® 1160S PE wax having diameters of 15 microns that were soaked in castor oil. The non-polar surface of the polyethylene attracted the castor oil, giving the microspheres 60 a lipid layer/oil coating 54b. The mixture 52 containing the PE microspheres was delivered to patients' eyes that a therapy regimen of one drop in each eye four times a day. This therapy has anecdotally been demonstrated to reduce dry eye symptoms, reducing evaporation and friction, and allows lubricant to migrate underneath the eyelids. Dry spots on the cornea have also been shown to improve. FIG. 6 shows images 80L, 80R of a patient's eye 20 before and after therapeutic application with such a mixture. Fluorescein drops were administered to the eye in order to help identify dry spots 70 on the cornea 30 known as punctate keratopathy, which is associated with dry eyes. The fluorescein stains epithelium (dry spots) 70, which are also known as punctate keratopathy. The left image 80L of FIG. 6 shows the patient's eye 20 before therapy. This image 80L shows many punctate keratopathy (dry spots) 70 on the eye which has not undergone therapy. An image 80R of the same eye 20 after therapy with the above-described mixture 52 is shown on the right of FIG. 6. As shown, there is a dramatic reduction in the amount and intensity of punctate keratopathy (dry spots) 70. As such, it is determined that the mixture 52 was effective in lessening punctate keratopathy. To clarify, such mixture 52 had an oil part 54 and an aqueous part 56 temporarily form a thermodynamically unstable emulsion when shaken. The mixture 52 also includes PE wax microspheres 60 having diameters of about 15 microns. With such microspheres 60 present in the mixture 52 with the oil part 54, the oil part 54 appeared to disperse as a film across the surface of the eye rather than coalesce in one or a few places. Thus, the microspheres 60 appear to have oil dispersant qualities. Further, upon eyelid closure the surface tear film is compressed down. On eyelid opening the tear film surprisingly floats up against gravity since the microspheres are more buoyant. Also, microspheres that did not go under the eyelid help evenly disperse oil for lubrication, tear film stability and to retard evaporation.

Menthol has been shown to have counterirritant and analgesic properties when used in eye drops. A corneal nerve sensory modulation mechanism may lie in the menthol inactive ingredient. In fact, menthol is commonly perceived to deliver a cooling sensation which may promote ocular comfort through agonist activity specifically on an evaporation-induced temperature sensor channel, Transient Receptor Potential Melastin 8, also known as TRPM8. However, menthol can only be slightly saturated in water. Previous eyedrops are capable of including only a limited concentration of menthol. Also in such previous eyedrops, menthol was quickly wiped away with the eyedrops. As a result, the menthol had only a short time of action. However, menthol mixes well with castor oil. In another aspect, menthol is mixed with castor oil (and, preferably, microspheres 60) before the oil 54 is mixed with the aqueous component 56. The castor oil can absorb menthol where the concentration of approximately 0.01-0.1%. It has been found that such mixing increases the concentration of menthol that can be included in the mixture 52. The menthol benefits from the other advantages of the mixture 52, and thus is distributed throughout the area underneath the eyelids 32, 34 and retained on the eye surface for a longer time, resulting in an increase in the time of action of menthol's beneficial properties.

Similarly as discussed above in connection with menthol, various drugs can be included with eyedrop mixtures including microspheres for administration to the eye. Due to the benefits of microspheres improving lubrication and providing space for distributing the mixture under the eyelids 32, 34, such potential drugs can expect to have increased absorption, as they are distributed more broadly under the eyelids 32, 34 and retained on the eye surface for a longer period of time.

It is to be understood that further substances can be added to the mixture 52 to increase its effectiveness. In another aspect, an ultra-filtrate of snail mucin, which resembles human mucin, can be added to the mixture 52 to enhance the mucin layer 46 of the tear film 44, as well as the mucus layer on the inner surface of the eyelids 32, 34. In one variation, 5-10 drops of the snail mucin can be added per 10 mL of the mixture 52 discussed above.

It is further to be understood that additional substances, such as demulsifiers, can be added in some variations in order to speed up the disassociating process of the thermodynamically unstable emulsion.

Although it is anticipated that the microspheres 60 will be, in fact, generally spherical, it is to be understood that non-spherical microparticles of the same general size range can also be combined with an aqueous component in a mixture for application to the eyes and yield beneficial results. For example, microparticles that are generally oblong and/or having a variety of specific shapes may still, for example, gently lift the eyelids, so as to provide space for distribution of oils and medicaments.

Embodiments disclosed above have been in the context of an eyedrop mixture. It is to be understood that, in additional embodiments, microspheres 60 coated with a lubricant and possibly disposed within an oil component 54 can be provided as an excipient to be added to an existing eyedrop mixture.

Although inventive subject matter has been disclosed in the context of certain illustrated embodiments, aspects, variations and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A mixture for administration to a surface of a user's eye, comprising:
    an aqueous portion comprising water;
    an oil component; and
    a plurality of microparticles having a range of sizes of 1-60 microns in diameter, wherein:
    i. the mixture is disposed within an eye dropper bottle;
    ii. the oil component is separated from the aqueous portion within the eye dropper bottle;
    iii. the plurality of microparticles is disposed within the oil component;
    iv. the oil component and the plurality of microparticles are mixed within the aqueous portion upon shaking to form a temporary emulsion; and
    v. the plurality of microparticles comprise a polyethylene wax.

2. The mixture of claim 1, wherein the range of sizes of the plurality of microparticles is 10 to 30 microns.

3. The mixture of claim 2, wherein the polyethylene wax of the plurality of microparticles has a spherical configuration.

4. The mixture of claim 2, wherein the plurality of microparticles is coated with castor oil.

5. The mixture of claim 3, wherein the plurality of microparticles is coated with castor oil.

6. The mixture of claim 1, wherein the plurality of microparticles is between 15-25 microns in diameter.

7. The mixture of claim 1, further comprising at least one of carboxymethylcellulose, hyaluronic acid, mucin or combinations thereof.

8. The mixture of claim 1, further comprising an active ingredient disposed in the aqueous portion, the active ingredient being menthol.

9. The mixture of claim 1, wherein the oil component is disposed as a layer over the aqueous portion within the eye dropper bottle.

10. The mixture of claim 1, wherein, after the shaking, at least 75% of the oil component disassociates from the aqueous portion within two minutes.

11. A mixture for administration to a surface of a user's eye, comprising:
    an aqueous portion comprising water;
    an oil component, the oil component comprising castor oil; and
    a plurality of microparticles having a range of sizes of 1-60 microns in diameter, the plurality of microparticles comprising a polyethylene wax, the plurality of microparticles being coated with castor oil, the plurality of microparticles having a spherical configuration, wherein:
    i. the mixture is disposed within an eye dropper bottle;
    ii. the oil component is separated from the aqueous portion and disposed as a layer over the aqueous portion within the eye dropper bottle;
    iii. the plurality of microparticles is disposed within the oil component;
    iv. an agitator is disposed within the eye dropper bottle for mixing the oil component and the plurality of microparticles within the aqueous portion upon shaking to form a temporary emulsion; and
    v. after the shaking, at least 75% of the oil component disassociates from the aqueous portion with two minutes.

12. The mixture of claim 11, wherein the plurality of microparticles is between about 15-25 microns in diameter.

13. The mixture of claim 11, further comprising at least one of carboxymethylcellulose, hyaluronic acid, mucin or combinations thereof.

14. The mixture of claim 11, further comprising an active ingredient disposed in the aqueous portion, the active ingredient being menthol.

15. A method of providing therapy to dry eyes, comprising:
    providing a mixture for administration to a user's eye, the mixture comprising an oil component, an aqueous portion comprising water, and plurality of microparticles, wherein:
    i. the mixture is disposed within an eye dropper bottle;
    ii. the plurality of microparticles have diameters between about 5-60 microns;
    iii the oil component is separated from the aqueous portion within the eye dropper bottle;
    iv. the plurality of microparticles is disposed within the oil component; and
    v. the plurality of microparticles comprise a polyethylene wax;
    shaking the mixture to form a temporary emulsion; and
    administering the temporary emulsion to a surface of the user's eye.

16. The method of claim 15, wherein the diameters of the plurality of microparticles is 10 to 30 microns.

17. The method of claim 16, wherein the polyethylene wax of the plurality of microparticles has a spherical configuration.

18. The method of claim 17, wherein the plurality of microparticles is coated with castor oil.

19. The method of claim 16, wherein the plurality of microparticles is between 15-25 microns in diameter.

20. The method of claim 15, wherein the oil component is disposed as a layer over the aqueous portion within the eye dropper bottle.

* * * * *